(12) United States Patent
Kawajiri et al.

(10) Patent No.: US 11,306,602 B2
(45) Date of Patent: Apr. 19, 2022

(54) GUIDE VANE AND FLUID MACHINE

(71) Applicants: KABUSHIKI KAISHA TOSHIBA, Minato-ku (JP); TOSHIBA ENERGY SYSTEMS & SOLUTIONS CORPORATION, Kawasaki (JP)

(72) Inventors: Hideyuki Kawajiri, Yokohama (JP); Yoshihiro Ishikawa, Yokohama (JP); Hajime Koyama, Yokohama (JP); Yukito Yada, Yokohama (JP)

(73) Assignees: KABUSHIKI KAISHA TOSHIBA, Minato-ku (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 17/152,198

(22) Filed: Jan. 19, 2021

(65) Prior Publication Data
US 2021/0140332 A1    May 13, 2021

Related U.S. Application Data

(62) Division of application No. 16/181,521, filed on Nov. 6, 2018, now abandoned.

(30) Foreign Application Priority Data

Nov. 9, 2017    (JP) ............................. JP2017-216737

(51) Int. Cl.
*F01D 9/04* (2006.01)
*F01D 5/14* (2006.01)
*F01D 17/16* (2006.01)

(52) U.S. Cl.
CPC ............. *F01D 9/041* (2013.01); *F01D 5/141* (2013.01); *F01D 5/145* (2013.01); *F01D 17/162* (2013.01);
(Continued)

(58) Field of Classification Search
CPC .......... F03B 3/123; F03B 3/138; F01D 5/141; F01D 17/165; F05D 2250/90;
(Continued)

(56) References Cited

U.S. PATENT DOCUMENTS 4,575,307 A     3/1986   Shinohara
2014/0308119 A1  10/2014  Harada et al.
(Continued)

FOREIGN PATENT DOCUMENTS

GB       578034 A  *  6/1946   .............. F03B 3/183
GB       579034 A      7/1946
(Continued)

OTHER PUBLICATIONS

Combined Office Action and Search Report dated Apr. 1, 2020 in Chinese Patent application No. 201811316988.7 (with English translation and English Translation of Category), 14 pages.
(Continued)

*Primary Examiner* — Courtney D Heinle
*Assistant Examiner* — Ryan C Clark
(74) *Attorney, Agent, or Firm* — Oblon, McClelland, Maier & Neustadt, L.L.P.

(57) ABSTRACT

In a guide vane according to an embodiment of the invention, where in a section perpendicular to a guide vane rotation axis, a curvature of a contour line forming a runner side vane surface of the guide vane is referred to as a positive curvature when the contour line is formed to be convex, while the curvature of the contour line is referred to as a negative curvature when the contour line is formed to be concave, a negative curvature portion where the curvature of the contour line becomes negative is provided on the runner side vane surface. The negative curvature portion is formed from an upper end portion to a lower end portion of the runner side vane surface.

7 Claims, 7 Drawing Sheets

(52) U.S. Cl.
CPC ...... *F05D 2210/11* (2013.01); *F05D 2220/30* (2013.01); *F05D 2240/12* (2013.01); *F05D 2240/124* (2013.01)

(58) Field of Classification Search
CPC ......... F05D 2250/711; F05D 2250/712; F05D 2250/713
See application file for complete search history.

(56) References Cited

U.S. PATENT DOCUMENTS

| | | |
|---|---|---|
| 2015/0071777 A1 | 3/2015 | Willer |
| 2017/0175555 A1 | 6/2017 | Chauhan |
| 2019/0048725 A1 | 2/2019 | Ramm |

FOREIGN PATENT DOCUMENTS

| | | | | |
|---|---|---|---|---|
| JP | 2000-120521 A | | 4/2000 | |
| JP | 2000120521 A | * | 4/2000 | ............... F03B 3/06 |
| JP | 2012-172605 | | 9/2012 | |
| JP | 2014-80929 | | 5/2014 | |
| JP | 2014125708 A | * | 7/2014 | |
| JP | 2014-152708 A | | 8/2014 | |
| JP | 2015-10569 | | 1/2015 | |

OTHER PUBLICATIONS

Wang Yun-ying, Hydraulic Turbine, China Water Conservancy and Electric Power Press, Oct. 1993, (pp. 15-18, 288-298), 20 pages.

* cited by examiner

GUIDE VANE AND FLUID MACHINE

CROSS-REFERENCE TO RELATED APPLICATIONS

This application is a division of U.S. application Ser. No. 16/181,521, filed Nov. 6, 2018, which is based upon and claims the benefit of priority from Japanese Patent Application No. 2017-216737, filed Nov. 9, 2017; the entire contents of which are incorporated herein by reference.

FIELD

An embodiment of the present invention relates to a guide vane and a fluid machine.

BACKGROUND

A turbine such as a Francis turbine or an axial turbine or a pump turbine is mentioned as a example of a fluid machine. Here, the Francis turbine which is used in a typical fluid machine will be exemplarily described.

In the Francis turbine, water flows from an upper reservoir into a spiral casing through an iron pipe. Then, the water that has entered the casing is guided into a runner through a flow channel defined by stay vanes and guide vanes. The runner is driven to be rotated by the flowing water guided into the runner, whereby the pressure energy of the flowing water is converted into rotational energy. The runner being driven to rotate drives a generator coupled to the runner by way of a primary shaft, whereby electric power is generated. The flowing water used to drive to rotate the runner is discharged into a lower reservoir (or a tail race) through an draft tube.

The guide vanes are provided on an outer circumferential side of the runner and are disposed at equal intervals in a circumferential direction that is centered at a runner rotation axis. A link mechanism is coupled to each guide vane, so that the guide vane can be rotated about the guide vane rotation axis. The guide vane can rotate from a fully closed state to a maximum opening that is permissible in the link mechanism. Rotating the guide vane to a desired opening allows an amount of water matching a desired generation amount of electric power to be supplied to the runner.

Here, FIGS. 14 and 15 illustrate plan views of stay vanes 50 and guide vanes 51. As FIG. 14 illustrates, a plurality of stay vanes 50 and a plurality of guide vanes 51 are each provided at certain intervals in a circumferential direction, so that water flows through flow channels defined between the stay vanes 50 and through flow channels defined between the guide vanes 51, respectively. Vane surfaces of the stay vanes 50 and the guide vanes 51 are shaped so as to realize a smooth flow of water from the casing to the runner.

As described above, the guide vane 51 rotates about its guide vane rotation axis, whereby the opening of the guide vane 51 is controlled. For example, the opening of the guide vane 51 decreases as FIG. 14 illustrates, while the opening of the guide vane 51 increases as FIG. 15 illustrates. In this case, the angle at which water flows into the flow channels defined between the guide vanes 51 and the inlet angle of the guide vanes 51 are caused to deviate, resulting in fears that a flow separation occurs depending on situations. For example, when the opening of the guide vane 51 is small as FIG. 14 illustrates, a flow separation can occur on an inner circumferential side (a runner side) of the guide vane 51. When the opening of the guide vane 51 is large as FIG. 15 illustrates, a flow separation can occur on an outer circumferential side (a side facing the stay vane 50) of the guide vane 51. Since an area where the flow separation is occurring does not function as the flow channel through which water flows, the flow channels defined by the guide vanes 51 are narrowed substantially. This causes a problem in which the loss of water flow is increased.

To deal with the problem, the vane surface of the guide vane is normally formed to be convex (or straight) with respect to the surface of flowing water, when seen in a section which is perpendicular to the guide vane rotation axis. The vane surface of the guide vane is designed to have no concavity on it. This is because when the vane surface is formed to have a concavity on it, the flow channel defined between the guide vanes is expanded, whereby a boundary layer is developed or the flow rate is decreased near the vane surface of the guide vane to thereby generate a flow separation.

However, when the runner side vane surface provided on the runner side of the guide vane and the stay vane side vane surface provided on the stay vane side of the guide vane are both formed to be convex as a whole, the resulting flow channel defined by such guide vanes comes to have a complex configuration, whereby the flow velocity is increased locally from time to time. An increase in flow velocity like this causes a problem in which the friction loss is increased.

DETAILED DESCRIPTION

A guide vane described in in the following embodiments is a guide vane provided on an outer circumferential side of a runner of a fluid machine and configured to rotate about a guide vane rotation axis to thereby control a flow rate of water flowing into the runner. In a section perpendicular to the guide vane rotation axis, a curvature of a contour line forming a runner side vane surface of the guide vane is referred to as a positive curvature when the contour line is formed to be convex, while a curvature of the contour line is referred to a negative curvature when the contour is formed to be concave. Then, a negative curvature portion is provided on the runner side vane surface where the curvature of the contour line is negative. The negative curvature portion is formed from the upper end portion to the lower end portion of the runner side vane surface.

A fluid machine described in the embodiments includes a runner and the guide vane provided on an outer circumferential side of the runner.

Hereinafter, guide vanes and fluid machines according to embodiments of the invention will be described with reference to drawings.

First Embodiment

Referring to FIGS. 1 to 8, a guide vane and a fluid machine according to a first embodiment will be described. Firstly, referring to FIG. 1, a Francis turbine will be described as an example of a fluid machine.

Figure 1:
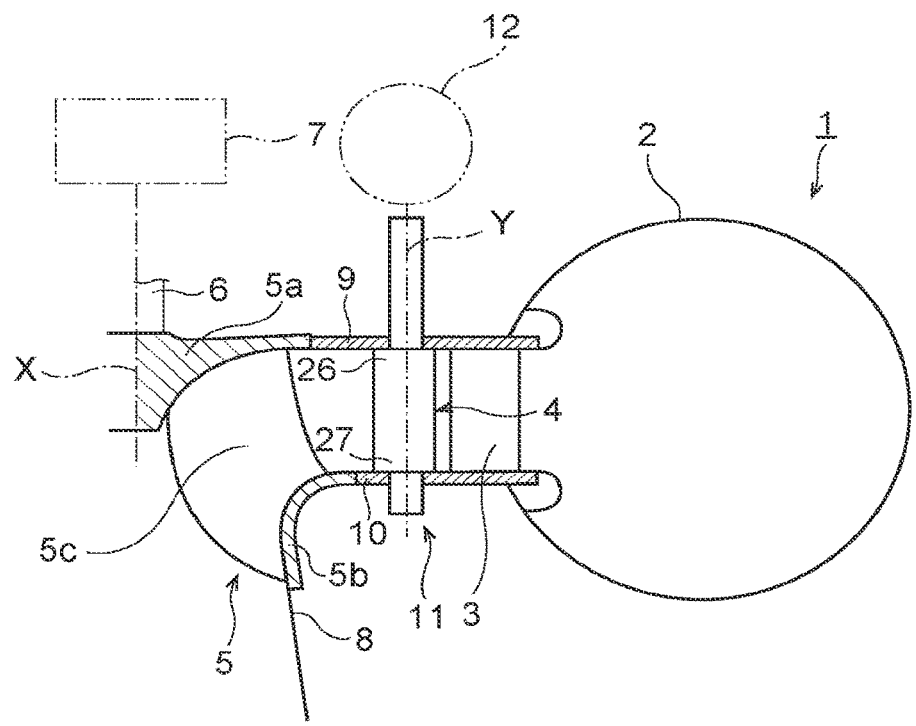
FIG. 1 is a sectional view illustrating an overall configuration of a Francis turbine according to a first embodiment.

As FIG. 1 illustrates, a Francis turbine 1 includes a spiral casing 2 into which water flows from an upper reservoir through an iron pipe (both of which are not illustrated) when the turbine is in operation, a plurality of stay vanes 3 provided on an inner circumferential side of the casing 2, a plurality of guide vanes 4 provided on an inner circumferential side of the stay vanes 3, and a runner 5 provided on an inner circumferential side of the guide vanes 4.

Figure 14:
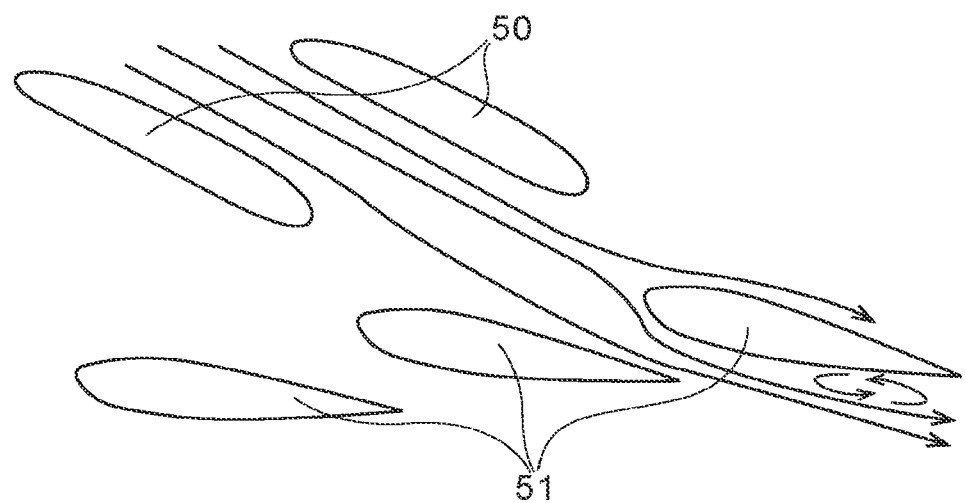
FIG. 14 is a plan view illustrating stay vanes and guide vanes of a general Francis turbine with an opening of the guide vanes decreased.
Figure 15:
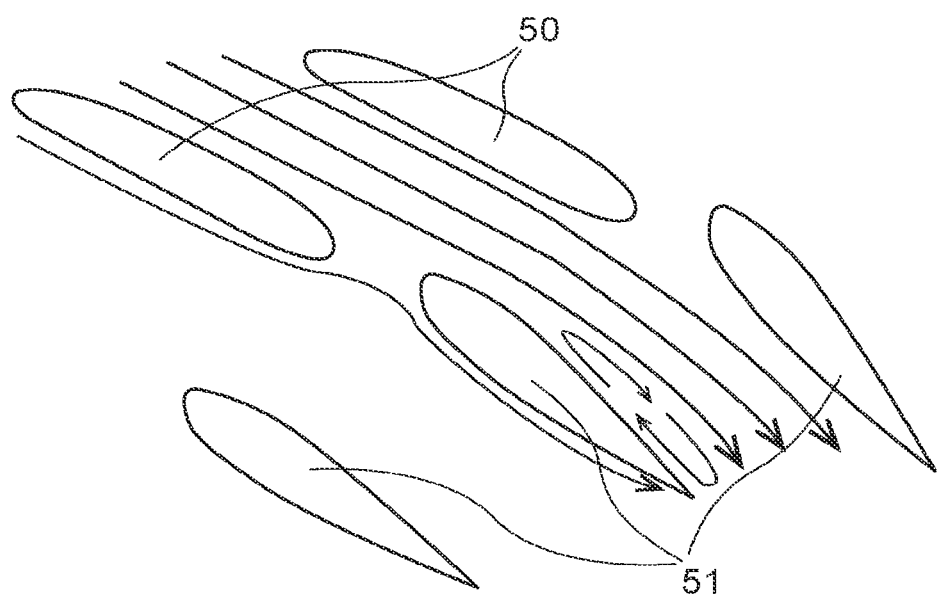
FIG. 15 is a plan view illustrating the stay vanes and the guide vanes of the general Francis turbine with the opening of the guide vanes increased.

The stay vanes 3 are provided at certain intervals in a circumferential direction (refer to FIGS. 1, 14, 15). The stay vanes 3 are provided between an upper cover 9 and a lower cover 10. A flow channel is defined by each pair of stay vanes 3 lying adjacent to each other, the upper cover 9 and the lower cover 10. Water flowing out of the casing 2 flows through the flow channels and is then guided to the guide vanes 4 while being rectified by the stay vanes 3.

The guide vanes 4 are provided at certain intervals in the circumferential direction (refer to FIGS. 1, 14, 15). The guide vanes 4 are provided between the upper cover 9 and the lower cover 10, and a flow channel is defined by each pair of guide vanes 4 lying adjacent to each other, the upper cover 9 and the lower cover 10. Water flowing out of the stay vanes 3 flows through the flow channels and is then guided to the runner 5.

The guide vanes 4 are provided on an outer circumferential surface of the runner 5, whereby a flow rate of water into the runner 5 can be controlled. Each guide vane 4 is configured to rotate abut a guide vane rotation axis Y extending substantially parallel to a runner rotation axis X, which will be described later. A guide vane system 11 is made up of the plurality of guide vanes 4 described heretofore. That is, the guide vane system 11 has the plurality of guide vanes 4, a guide vane driver 12 configured to rotate the guide vanes 4 about the corresponding vane rotating axes Y, a link mechanism (not shown) configured to connect the individual guide vanes 4 with the guide vane driver 12. By adopting the configuration of the guide vane system 11, the guide vanes 4 rotate in an interlocked fashion, whereby a flow channel area (a guide vane opening) between the guide vanes 4 can be controlled. Thus, the flow rate of water to the runner 5 disposed downstream can be controlled so as to control the output of generated electric power of the generator 7, which will be described later.

As FIG. 1 illustrates, the runner 5 is configured to be driven to rotate by water flowing from the guide vanes 4. That is, the runner 5 has a crown 5a coupled to a primary shaft 6, which will be described later, a band provided on an outer circumferential side of the crown 5a, and a plurality of runner vanes 5c provided between the crown 5a and the band 5b. In these constituent elements, the runner vanes 5c are provided at certain intervals in the circumferential direction. A flow channel is defined by each pair of runner vanes 5c lying adjacent to each other, the crown 5a and the band 5b, and water flowing out of the guide vanes 4 flows through each flow channel. The runner 5 can rotate about the runner rotation axis X. In this way, a pressure exerted by flowing water is then exerted on the runner vanes 5c, whereupon the runner 5 is driven to rotate, whereby the pressure energy of flowing water is converted into the rotational energy of the runner 5.

The runner 5 is coupled to a generator 7 via the primary shaft 6. This generator 7 is configured to generate electric power while the Francis turbine 1 is in operation.

An draft tube 8 is provided on a downstream side of the runner 5. This draft tube 8 is connected to a lower reservoir (or a tail race), not shown, so that water used to drive to rotate the runner 5 is discharged to the lower reservoir through the draft tube 8.

With the Francis turbine 1 configured as a pump turbine, the generator 7 drives to rotate the runner 5 as a motor while the Francis turbine 1 is operating as a pump (to pump up water). This pumps up water remaining in the draft tube 8. Water pumped up by the runner 5 flows into the casing 2 through between the guide vanes 4 and the stay vanes 3 and is then discharged from the casing 2 into the upper reservoir through the iron pipe.

Next, referring to FIGS. 2 to 5, the guide vane 4 according to this embodiment will be described.

Figure 2:
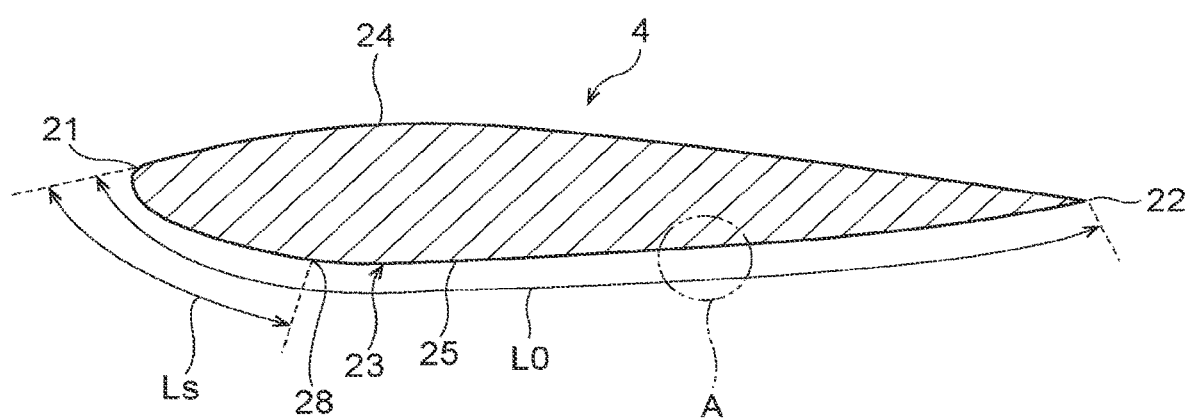
FIG. 2 is a plan sectional view illustrating a guide vane in FIG. 1.

As FIG. 2 illustrates, the guide vane 4 has an inlet end 21, an outlet end 22, a runner side vane surface 23 provided on a side facing the runner 5 (an inner circumferential side) of the guide vane 4, and a stay vane side vane surface 24 provided on an opposite side to the side facing the runner 5 (a side facing the stay vane 3, an outer circumferential side) of the guide vane 4. As FIGS. 14 and 15 illustrate, the guide vane 4 is provided so as to follow a direction in which water flowing out between the stay vanes 3 flows. The runner side vane surface 23 corresponds to a lower surface of the guide vane 51 illustrated in FIG. 14 and corresponds to a left lower surface of the guide vane 51 illustrated in FIG. 15. The stay vane side vane surface 24 corresponds to an upper surface of the guide vane 51 illustrated in FIG. 14 and corresponds to a right upper surface of the guide vane 51 illustrated in FIG. 15. As FIG. 2 illustrates, both the runner side vane surface 23 and the stay vane side vane surface 24 extend from the inlet end 21 to the outlet end 22.

Figure 3:
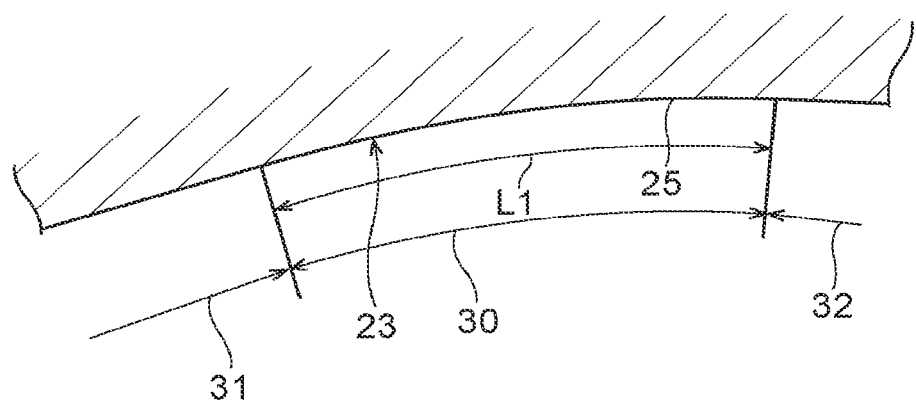
FIG. 3 is an enlarged view of a portion A in FIG. 2.
Figure 4:
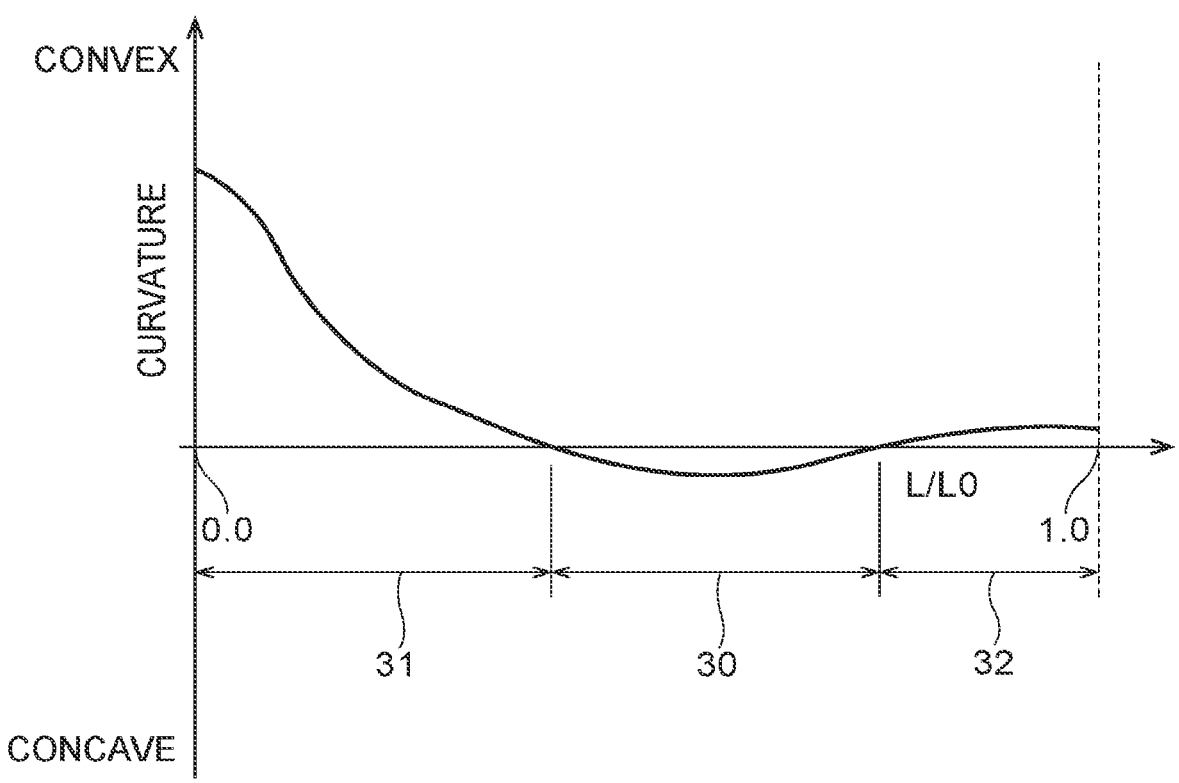
FIG. 4 is a chart illustrating a curvature of a contour line in a flat plane section of a runner side vane surface of the guide vane illustrated in FIG. 2.

As FIGS. 2 to 4 illustrate, a negative curvature portion 30 is provided on the runner side vane surface 23 where a curvature of a contour line 25 forming the runner side vane surface 23 in a section perpendicular to the guide vane rotation axis Y becomes negative. Here, the curvature of the contour line 25 is referred to as a positive curvature when the contour line 25 is formed to be convex with respect to a surface of flowing water, while the curvature of the contour line 25 is referred to as a negative curvature when the contour line 25 is formed to be concave with respect to the surface of flowing water. When the contour line 25 is formed to be straight, the curvature becomes zero. This will be described in greater detail below.

FIG. 2 is a plan sectional view illustrating a guide vane viewed in a section taken perpendicular to the guide vane rotation axis Y. FIG. 3 is a plan sectional view illustrating the negative curvature portion 30 in FIG. 2 in an enlarged fashion. In the plan sectional views, the contour line 25 forming the runner side vane surface 23 is illustrated. That is, the contour line 25 constitutes a line defining a shape of the runner side vane surface 23 in horizontal section. A curvature of the contour line 25 is illustrated in FIG. 4. Part of the contour line 25 of the runner side vane surface 23 has a negative curvature. The portion having this negative curvature constitutes the negative curvature portion 30. Here, the horizontal axis in FIG. 4 denotes a position in a direction from the inlet end 21 towards the outlet end 22. L0 denotes a length of the negative curvature portion 30 along the contour line 25 which extends from the inlet end 21 to the outlet end 22, and L denotes a variable corresponding to a length from the inlet end 21 to an arbitrary position along the contour line 25. L/L0 denotes a dimensionless value of a length from the inlet end 21, which denotes an arbitrary position on the contour line 25. L/L0 becomes 0.0 at the inlet end 21, and L/L0 becomes 1.0 at the outlet end 22. The vertical axis in FIG. 4 denotes a curvature of the contour line 25.

For the sake of clarifying the illustration in FIG. 3, the curvature of the contour line 25 at the negative curvature portion 30 is enlarged intentionally to exaggerate the shape of the negative curvature portion 30. The curvature of the contour line 25 at the negative curvature portion 30 preferably takes such a value that prevents the occurrence of flow separation in a flow of water near the negative curvature portion 30. To make the flow of water near the negative curvature portion 30 smooth, an absolute value of the curvature of the contour line 25 at the negative curvature portion 30 is made smaller than an absolute value of the curvature of the contour line 25 illustrated in FIG. 3 so as to give a smooth shape to the negative curvature portion 30.

The negative curvature portion 30 is formed to extend from an upper end portion 26 (an end portion facing the upper cover 9, refer to FIG. 1) to a lower end portion 27 (an end portion facing the lower cover 10, refer to FIG. 1) of the runner side vane surface 23. The curvature of the contour line 25 at the negative curvature portion 30 may be constant over the full length in an up-and-down direction. That is, curvatures of the contour line 25 forming the runner side vane surface 23 at sections taken perpendicular to the guide vane rotation axis Y in each position along the up-and-down direction may be equal to one another.

As FIGS. 3 and 4 illustrate, an inlet non-negative curvature portion 31 where the curvature of the contour line 25 is zero or larger (a positive curvature or zero curvature) is provided at a portion of the runner side vane surface 23 which lies closer to the inlet end 21 of the guide vane 4 than the negative curvature portion 30. Additionally, an outlet non-negative curvature portion 32 where the curvature of the contour line 25 is zero or larger (a positive curvature or zero curvature) is provided at a portion of the runner side vane surface 23 which lies closer to the outlet end 22 of the guide vane 4 than the negative curvature portion 30. That is, in this embodiment, the curvature of the contour line 25 is zero or larger over the portion from the negative curvature portion 30 to the inlet end 21, and the curvature of the contour line 25 is zero or larger over the portion from the negative curvature portion 30 to the outlet end 22. A length L1 of the negative curvature portion 30 along the contour line 25 (refer to FIG. 3) is expressed, for example, by 0.03×L0 to 0.2×L0.

Next, the function of the embodiment configured as described heretofore will be described.

When the Francis turbine 1 according to the embodiment is operated as a turbine, water flows into the casing 2 from the upper reservoir through the iron pipe. The water that has flowed into the casing 2 flows into the runner 5 by way of the flow channels defined by the stay vanes 3 and the guide vanes 4. Then, the runner 5 is driven to rotate by the water that has flowed into the runner 5. This drives the generator 7 coupled to the runner 5 to generate electric power. The water that has flowed into the runner 5 then passes through the draft tube 8 from the runner 5 to be discharged into the lower reservoir (or a tail race).

While the Francis turbine 1 is kept rotating as a turbine, water flowing out of the flow channels defined by the stay vanes 3 flows into the flow channels defined by the guide vanes 4.

Figure 5:
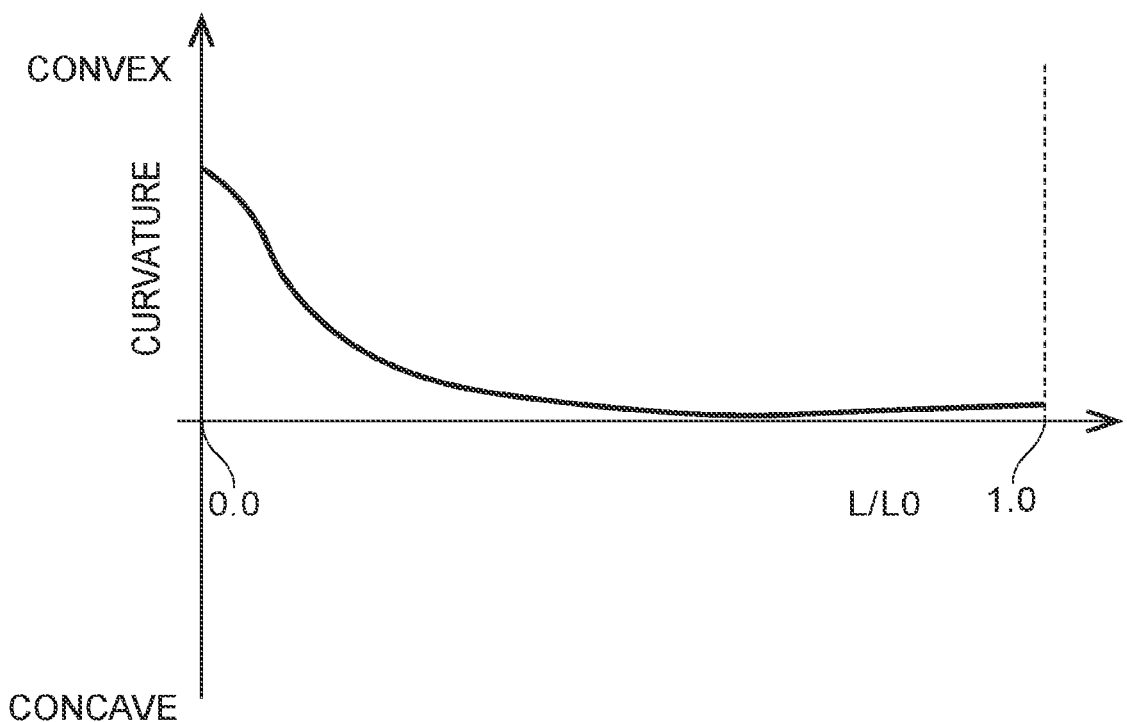
FIG. 5 is a chart illustrating a curvature of a contour line of a flat plane section of a runner side vane surface of a general guide vane as a comparison example.

Here, in a general guide vane, as FIG. 5 illustrates, a curvature of a contour line forming a runner side vane surface is larger than zero along a full length from an inlet end to an outlet end, taking a positive curvature. In this case, since the runner side vane surface is formed to be convex as a whole, the flow velocity is considered to be increased locally. This increase in flow velocity causes a problem in which the friction loss is increased. This will be described in detail by reference to FIGS. 6 to 8.

Figure 6:
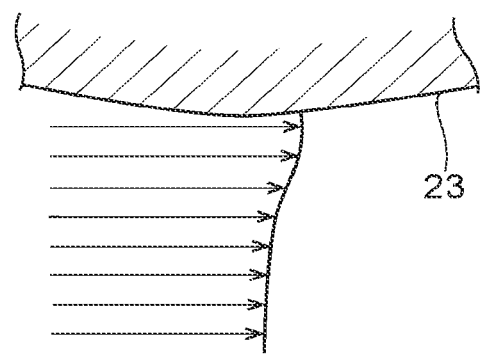
FIG. 6 is a schematic plan sectional view illustrating flows near a runner side vane surface formed to be convex.
Figure 7:
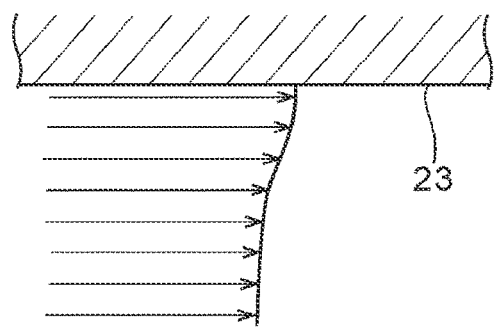
FIG. 7 is a schematic plan sectional view illustrating flows near a runner side vane surface formed to be straight.

The flow channel defined by a pair of guide vanes 4 which lie adjacent to each other comes to have a complex shape, which may cause an increase in flow velocity locally from time to time. For example, as FIG. 6 illustrates, when the runner side vane surface 23 is formed to be convex towards the flow channel of water, the flow velocity of water can be increased near the runner side vane surface 23. In addition, as FIG. 7 illustrates, even though the contour line of the runner side vane surface 23 is formed to be straight, when the shape of the flow channel is complex, an increase in flow velocity can take place locally.

Figure 8:
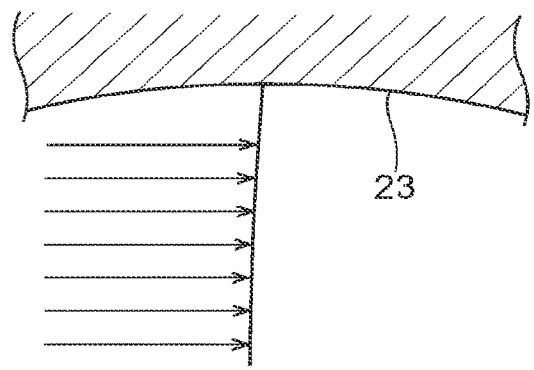
FIG. 8 is a schematic plan sectional view illustrating flows near a runner side vane surface formed to be concave.

Then, according to the guide vane 4 of this embodiment, as FIG. 8 illustrates, a portion of the runner side vane surface 23 where the flow velocity of water is increased is formed to be concave. This can increase a cross-sectional area (a cross-sectional area perpendicular to the flowing direction of water) of a portion of the flow channel where the flow velocity of water is increased to thereby mitigate the increase in flow velocity. The portion of the runner side vane surface 23 where the flow velocity of water is increased can be known through numerical analysis. Then, the value of a curvature of the contour line 25 at the relevant portion can be determined through numerical analysis so that the increase in flow velocity of water can be mitigated and a flow separation is not generated.

In this way, according to this embodiment, the negative curvature portion 30 is provided on the runner side vane surface 23 of the guide vane 4, and in this negative curvature portion 30, the curvature of the contour line 25 of the runner side vane surface 23 becomes negative in the section perpendicular to the guide vane rotation axis Y. This can mitigate the local increase in flow velocity of water in the flow channels defined by the guide vanes 4, whereby an increase in friction loss can be suppressed. This can increase the efficiency of the Francis turbine 1.

In addition, according to this embodiment, the negative curvature portion 30 is formed on the full length of the runner side vane surface 23 from the upper end portion 26 to the lower end portion 27. This can mitigate the local increase in flow velocity of water in each position in the up-and-down direction, whereby the increase in friction loss can be suppressed much more.

According to this embodiment, the inlet non-negative curvature portion 31 is provided at the portion of the runner side vane surface 23 which lies closer to the inlet end 21 of the guide vane 4 than the negative curvature portion 30, and in this inlet non-negative curvature portion 31, the curvature of the contour line 25 becomes zero or larger. This can avoid a risk of the curvature of the contour line 25 becoming negative near the inlet end 21. Here, water flowing to the guide vane 4 comes to collide with the portion of the guide vane 4 which lies near the inlet end 21, and this portion functions to cause the water colliding with the portion to flow around it to the runner side vane surface 23 and the stay vane side vane surface 24. Water comes flowing to collide with this portion from various directions depending on the opening of the guide vane 4. Thus, it is possible to prevent the occurrence of a flow separation near the inlet end 21 by avoiding the formation of the negative curvature portion 30 near the inlet end 21. This increases the efficiency of the Francis turbine 1 much more.

According to this embodiment, the outlet non-negative curvature portion 32 is provided at the portion of the runner side vane surface 23 which lies closer to the outlet end 22 of the guide vane 4 than the negative curvature portion 30. In this outlet non-negative curvature portion 32, the curvature of the contour line 25 is zero or larger. This can avoid a risk of the negative curvature portion 30 being formed near the outlet end 22.

Here, in the event that the thickness (a dimension perpendicular to the flow of water) of the guide vane 4 is large near the outlet end 22 of the guide vane 4, an wake flow, which is a low flow velocity area formed on a downstream side of the outlet end 22, becomes large. In this case, since a loss produced by a mixture of the wake flow and a main flow is increased, the thickness of the guide vane 4 near the outlet end 22 thereof is set at a small value within a range that can ensure the strength thereof. Due to this, in the event that the negative curvature portion 30 is provided on the runner side vane surface 23 at a relatively thin portion of the guide vane 4, the stay vane side vane surface 24 comes to expand towards the outer circumferential side of the guide vane 4 (refer to FIG. 13), and the degree of convexity is increased (an absolute value of the positive curvature is increased). In this case, a boundary layer is developed near the stay vane side vane surface 24, whereby the width of the wake flow can be increased. Additionally, it is considered that water does not flow along the stay vane side vane surface 24, producing a flow separation.

In contrast with this, according to the embodiment, the negative curvature portion 30 can be prevented from being formed near the outlet end 22, and this can prevent the thickness of the guide vane 4 at the outlet end 22 being increased, whereby the wake flow can be prevented from being developed further. Additionally, the stay vane side vane surface 24 can be prevented from expanding towards the outer circumferential side near the outlet end 22 whose thickness is small. This can prevent the occurrence a flow separation near the outlet end 22, whereby the efficiency of the Francis turbine 1 can be enhanced much more.

Second Embodiment

Next, referring to FIG. 9, a guide vane and a fluid machine according to a second embodiment of the invention will be described.

Figure 9:
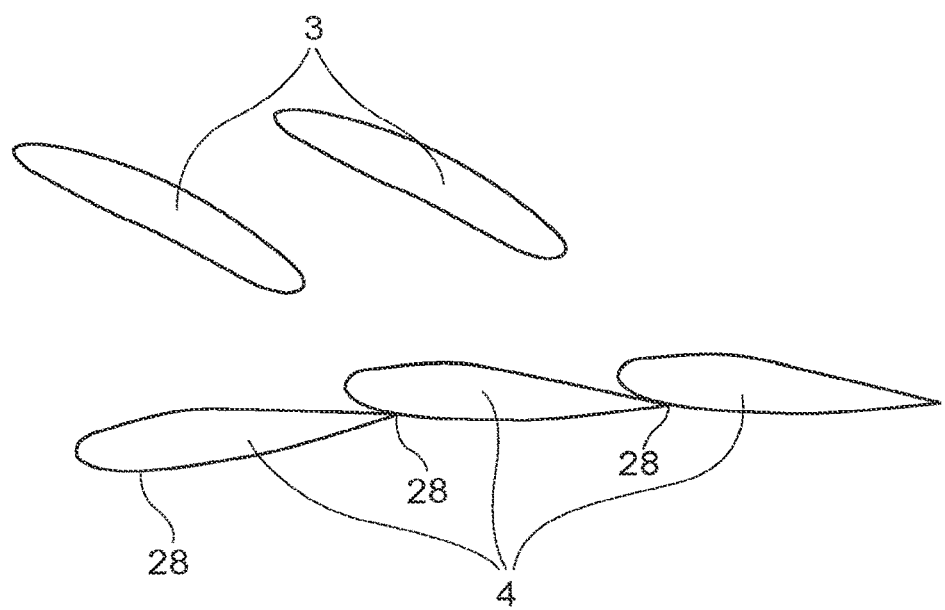
FIG. 9 is a plan view illustrating stay vanes and guide vanes with the guide vanes fully closed in a second embodiment.

As FIG. 9 illustrates, a second embodiment differs from the first embodiment illustrated in FIGS. 1 to 8 mainly in that a negative curvature portion is disposed at a portion of a runner side vane surface which lies closer to an outlet end of a guide vane than a contact point with which an adjacent guide vane comes to contact when the guide vanes are fully closed. The second embodiment is substantially the same as the first embodiment in relation to the other configurations. In FIG. 9, like reference numerals will be given to like potions to those of the first embodiment illustrated in FIGS. 1 to 8, and a detailed description of those like portions will be omitted.

FIG. 9 illustrates a state where in pairs of guide vanes 4, adjacent guide vanes 4 are in contact with each other when the guide vanes 4 are fully closed. In other words, in each pair of guide vanes 4, an outlet end 22 of one guide vane 4 comes into contact with a runner side vane surface 23 of the other guide vane 4 at a contact point 28, whereby flow channels defined by the guide vanes 4 are closed to thereby cut off a flow of water into a runner 5.

In this embodiment, a negative curvature portion 30 is disposed on the runner side vane surface 23 at a portion of the guide vane 4 which lies closer to the outlet end 22 than the contact point 28 with which the other guide vane 4 comes into contact when the guide vanes 4 are fully closed.

To be more specific, in a section perpendicular to a guide vane rotation axis Y, a length from an inlet end 21 to the contact point 28 along a contour line 25 is referred to Ls (refer to FIG. 2). Then, the negative curvature portion 30 is formed on at least part of a range of L which satisfies $Ls/L0 < L/L0$.

In other words, a range of L which satisfies $L/L0 \leq Ls/L0$ is made up of an inlet non-negative curvature portion 31. The negative curvature portion 30 is not formed in this range. The inlet non-negative curvature portion 31 may be formed continuously even in the range of L which satisfies $Ls/L0 < L/L0$.

Here, as an example, the contact point 28 lies within a range:

$0.05 \leq L/L0 \leq 0.15$.

In this way, according to this embodiment, in the section perpendicular to the guide vane rotation axis Y, the negative curvature portion 30 is disposed at the portion on the runner side vane surface 23 which lies closer to the outlet end 22 than the contact point 28 which contacts another guide vane 4 when the guide vanes 4 are fully closed. This enables the range from the inlet end 21 to the contact point 28 to be made up of the inlet non-negative curvature portion 31, and the formation of the negative curvature portion 30 within that range can be avoided. Here, water flowing to the guide vane 4 comes to collide with a portion of the guide vane 4 which extends from the inlet end 21 to the contact point 28 to thereby be caused to flow around it towards the runner side vane surface 23 and the stay vane side vane surface 24. Water flows to collide with this portion from various directions depending on the opening of the guide vane 4. This can eliminate a risk of the negative curvature portion 30 being formed within the range from the inlet end 21 to the contact point 28, whereby a flow separation can be prevented from occurring within that range. As a result, the efficiency of a Francis turbine 1 can be enhanced much more.

Third Embodiment

Next, referring to FIGS. 10 and 11, a guide vane and a fluid machine according to a third embodiment of the invention will be described.

Figure 10:
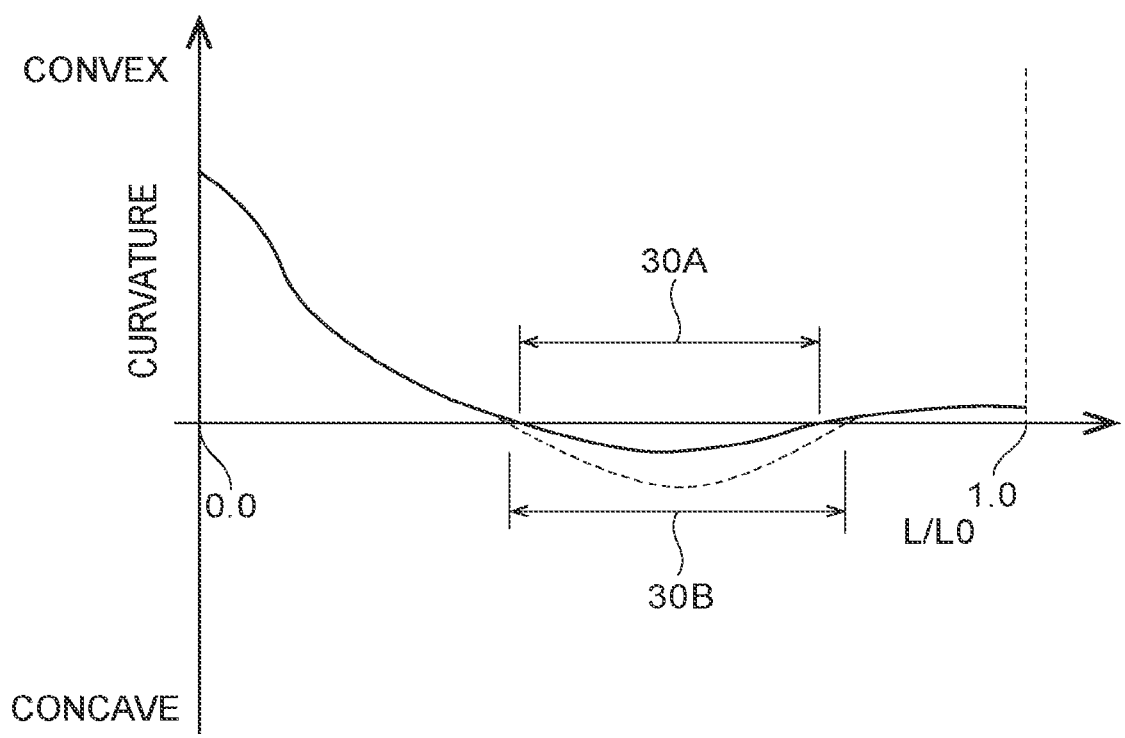
FIG. 10 is a chart illustrating curvatures of contour lines of runner side vane surfaces at a first section and a second section of a guide vane of a third embodiment.
Figure 11:
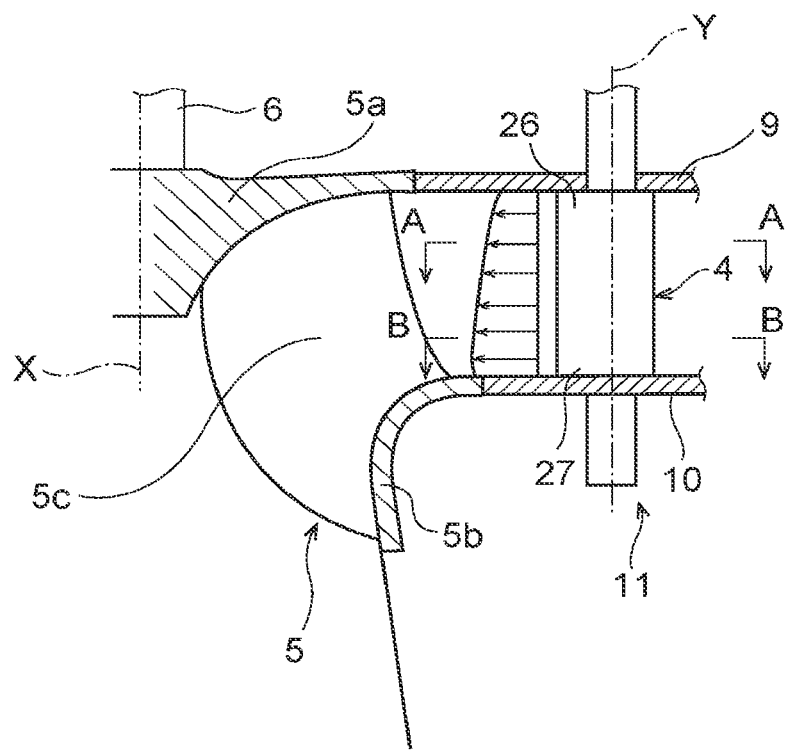
FIG. 11 is a schematic view illustrating a flow of water discharged from a guide vane in the third embodiment.

In the third embodiment illustrated in FIGS. 10 and 11, in a first section perpendicular to a guide vane rotation axis, a maximum value of an absolute value of a curvature of a contour line at a negative curvature portion is referred to a first curvature maximum value. In a second section parallel to the first section and situated below the first section, a maximum value of an absolute value of a curvature of a contour line at a negative curvature portion is referred to a second curvature maximum value. Then, the third embodiment differs mainly in that the second curvature maximum value is larger than the first curvature maximum value and is substantially the same as the first embodiment illustrated in FIGS. 1 to 8 in relation to the other configurations. In FIGS. 10 and 11, like reference numerals will be given to like portions to those of the first embodiment illustrated in FIGS. 1 to 8, and a detailed description of those like portions will be omitted.

As FIG. 10 illustrates, in this embodiment, a second curvature maximum value of a contour line 25 at a negative curvature portion 30B in a second section perpendicular to a guide vane rotation axis Y is larger than a first curvature maximum value of a contour line 25 at a negative curvature portion 30A in a first section perpendicular to the guide vane rotation axis Y. The first curvature maximum value is a maximum value of an absolute value of a curvature of the contour line 25 at the negative curvature portion 30A in the first section (for example, a section taken along a line A-A in FIG. 11). The second curvature maximum value is a maximum value of an absolute value of a curvature of the contour line 25 at the negative curvature portion 30B in the second section (for example, a section taken along a line B-B in FIG. 11). The second section is a section lying blow (on a side facing a lower end portion 27) of the first section and parallel to the first section. As a matter of convenience, a reference numeral of the negative curvature portion in the first section is 30A, while the reference numeral of the negative curvature portion in the second section is referred to as 30B.

In the embodiment illustrated in FIG. 10, a length of the negative curvature portion 30B extending along the contour line 25 in the second section is longer than a length of the negative curvature portion 30A in the first section. Then, the absolute value of the curvature of the contour line 25 at the negative curvature portion 30B in the second section is larger than the absolute value of the curvature of the contour line 25 at the negative curvature portion 30A in the first section in each position in the longitudinal direction along the contour line 25. Due to this, the degree of concavity of the contour line 25 at the negative curvature portion 30B in the second section is larger than the degree of concavity of the contour line 25 at the negative curvature portion 30A in the first section. The absolute value of the curvature of the contour line 25 at the negative curvature portion 30 may increase gradually from an upper end portion 26 (refer to FIG. 11) towards a lower end portion 27.

As FIG. 11 illustrates, water flows into a runner 5 from the guide vane 4 and flows out of the runner 5 with its flowing direction changed downwards. Due to this, water flowing out of the guide vane 4 tends to be deflected downwards (towards the lower end portion 27 and a band 5b). That is, the flow velocity of water passing the guide vane 4 tends to be increased at a lower portion of the guide vane 4. Due to this, the absolute value of the curvature of the negative curvature portion 30 becomes larger at the lower portion of the guide vane 4 where the flow velocity of water tends to be increased.

Thus, according to this embodiment, the second curvature maximum value of the negative curvature portion 30B in the second section which lies below the first section is larger than the first curvature maximum value of the negative curvature portion 30A in the first section. This can make the absolute value of the curvature of the negative curvature portion 30 become larger at a portion near the lower end portion 27 of the guide vane 4 where the flow velocity of water tends to be increased. This can enhance effectively the mitigation of the increase in flow velocity by the negative curvature portion 30. This can suppress an increase in friction loss much more, whereby the efficiency of the Francis turbine 1 can be enhanced much more.

Fourth Embodiment

Next, referring to FIGS. 12 and 13, a guide vane and a fluid machine according to a fourth embodiment of the invention will be described.

Figure 12:
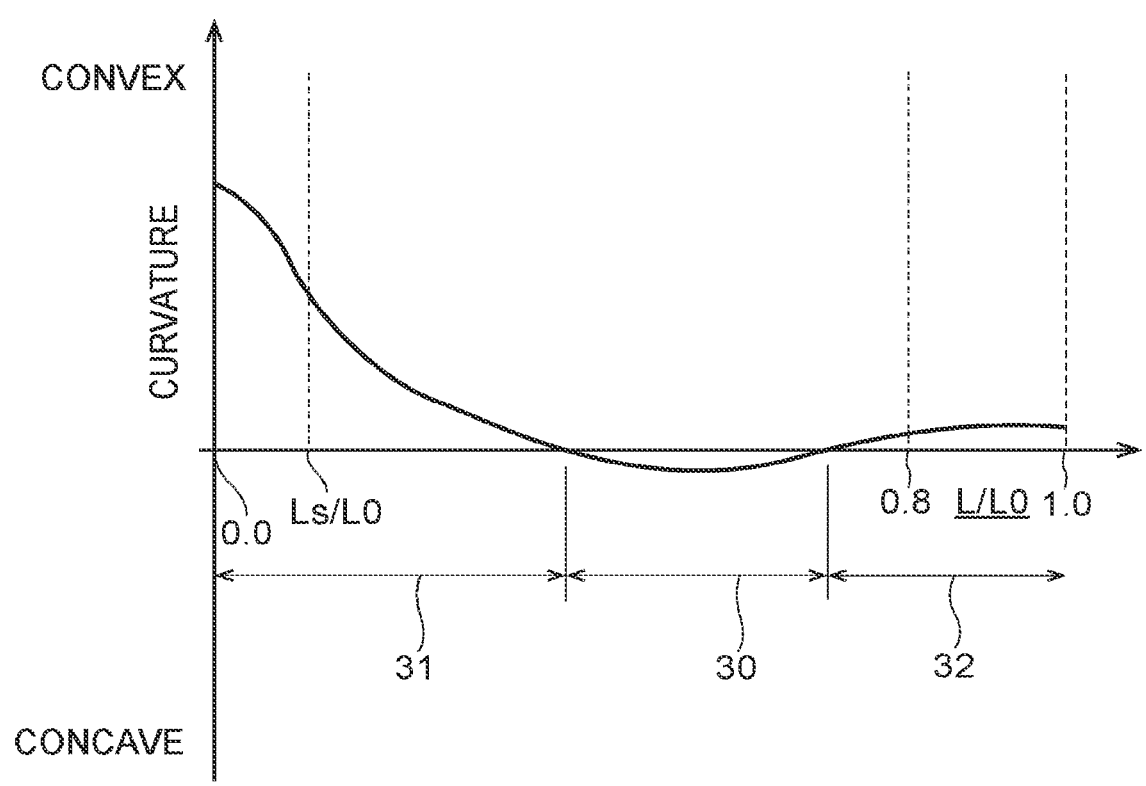
FIG. 12 is a chart illustrating a curvature of contour lines in a flat plane section of a runner side vane surface in a guide vane of a fourth embodiment.
Figure 13:
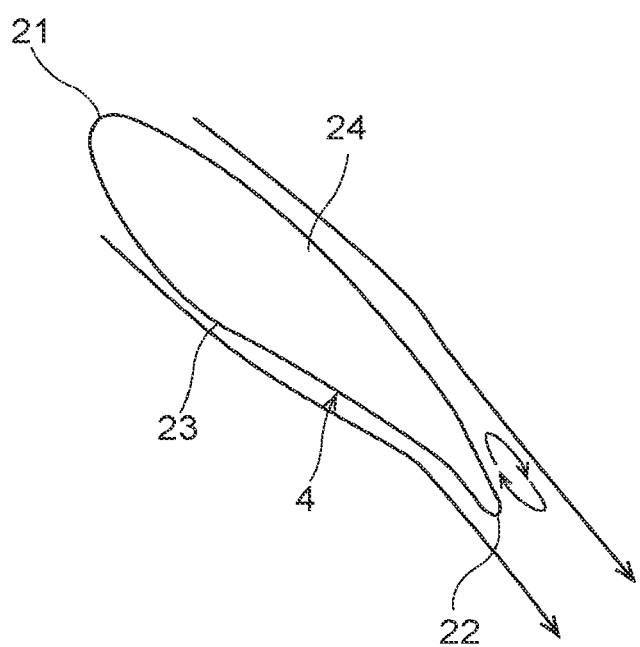
FIG. 13 is a plan view illustrating flows of water resulting when a negative curvature portion is provided near an outlet end of a runner side vane surface.

As FIGS. 12 and 13 illustrate, the fourth embodiment differs from the second embodiment mainly in that a negative curvature portion is formed on at least part of a range of L which satisfies L/L0≤0.8, and the other configurations remain substantially the same as those of the second embodiment illustrated in FIG. 9. In FIGS. 12 and 13, like reference numerals will be given to like portions to those of the second embodiment illustrated in FIG. 9, and a detailed description of those like portions will be omitted.

As FIG. 12 illustrates, a negative curvature portion 30 is formed on at least part of a range of L which satisfies $L/L0 \le 0.8$.

In other words, the range of L which satisfies 0.8<L/L0 is made up of an outlet non-negative curvature portion 32. No negative curvature portion 30 is formed within this range. As FIG. 12 illustrates, an outlet non-negative curvature portion 32 may be formed continuously even in a range of L which satisfies L/L0≤0.8.

On the other hand, a range of L which satisfies L/L0≤Ls/L0 is made up of an inlet non-negative curvature portion 31. However, this inlet non-negative curvature portion 31 may be formed continuously even in a range of L which satisfies Ls/L0<L/L0, as FIG. 12 illustrates.

Here, in the event that the thickness (a dimension perpendicular to the flow of water) of the guide vane 4 is large near an outlet end 22 of the guide vane 4, an wake flow, which is a low flow velocity area formed on a downstream side of the outlet end 22, becomes large. In this case, since a loss produced by a mixture of the wake flow and a main flow is increased, the thickness of the guide vane 4 near the outlet end 22 thereof is designed to be a small value within a range that can ensure the strength thereof. Due to this, in the event that the negative curvature portion 30 is provided on a runner side vane surface 23 at a relatively thin portion of the guide vane 4, as FIG. 13 illustrates, a stay vane side vane surface 24 comes to expand towards an outer circumferential side of the guide vane 4, and the degree of convexity is increased (an absolute value of a positive curvature is increased). In this case, a boundary layer is developed near the stay vane side vane surface 24, whereby the width of the wake flow can be increased. Additionally, it is considered that water does not flow along the stay vane side vane surface 24, producing a flow separation.

In contrast with this, according to the embodiment, the range of L which satisfies 0.8<L/L0 is made up of the outlet non-negative curvature portion 32. This can eliminate a risk of the negative curvature portion 30 being formed in this range. This can prevent the increase of the wake flow, whereby a flow separation can be prevented from occurring near the stay vane side vane surface 24. As a result of this, the efficiency of a Francis turbine 1 can be enhanced much more.

According to this embodiment that has been described heretofore, a local increase in flow velocity of water can be mitigated, thereby making it possible to suppress an increase in friction loss.

While the embodiments of the invention have been described heretofore, these embodiments are described as examples of the invention, and hence, there is no intention to limit the scope of the invention by those embodiments. These novel embodiments can be carried out in other various forms, and various omissions, replacements and modifications can be made to those embodiments without departing from the spirit and scope of the invention. The resulting embodiments and modifications are to be incorporated in the spirit and scope of the invention, and are also to be incorporated in the scope of inventions claimed for patent under accompanying claims and equivalents thereof. Needless to say, it is also possible to combine these embodiments partially as required within the spirit and scope of the invention.

Although the Francis turbine is described as representing the example of the fluid machine of the invention in the embodiments described above, the invention is not limited thereto, and hence, the guide vane and the fluid machine of the invention can also be applied to fluid machines other than the Francis turbine.

The invention claimed is:

1. A guide vane provided on an outer circumferential side of a runner of a fluid machine to control a flow rate of water into the runner by rotating about a guide vane rotation axis,
wherein, where in a section perpendicular to the guide vane rotation axis, a curvature of a contour line forming a runner side vane surface of the guide vane is referred to as a positive curvature when the contour line is formed to be convex, while the curvature of the contour line forming the runner side vane surface of the guide vane is referred to as a negative curvature when the contour line is formed to be concave, a negative curvature portion where the curvature of the contour line becomes negative is provided on the runner side vane surface, and
wherein the negative curvature portion is formed from an upper end portion to a lower end portion of the runner side vane surface,
wherein an inlet non-negative curvature portion where the curvature of the contour line becomes positive or zero is provided at a portion lying closer to an inlet end than the negative curvature portion, and
wherein an outlet non-negative curvature portion where the curvature of the contour line becomes positive is provided at a portion lying closer to an outlet end than the negative curvature portion,
wherein when L0 denotes a length of the negative curvature position along the contour line which extends from the inlet end to the outlet end and L denotes a length from the inlet end to an arbitrary position along the contour line, the negative curvature portion is formed on at least part of a range of L which satisfies $L/L0 \leq 0.8$, and the outlet non-negative curvature portion is formed on a range of L which satisfies $0.8 < L/L0$.

2. The guide vane according to claim 1,
wherein the negative curvature portion is disposed at a portion of the runner side vane surface lying closer to the outlet end than a contact point where the other guide vane is brought into contact when the guide vanes are closed fully.

3. The guide vane according to claim 2,
wherein, where a maximum value of an absolute value of the curvature of the contour line at the negative curvature portion in a first section perpendicular to the guide vane rotation axis is referred to as a first curvature maximum value, while a maximum value of an absolute value of the curvature of the contour line at the negative curvature portion in a second section lying below the first section and parallel to the first section is referred to as a second curvature maximum value, the second curvature maximum value is larger than the first curvature maximum value.

4. The guide vane according to claim 1,
wherein the negative curvature portion is disposed at a portion of the runner side vane surface lying closer to the outlet end than a contact point where the other guide vane is brought into contact when the guide vanes are closed fully.

5. The guide vane according to claim 4,
wherein, where a maximum value of an absolute value of the curvature of the contour line at the negative curvature portion in a first section perpendicular to the guide vane rotation axis is referred to as a first curvature maximum value, while a maximum value of an absolute value of the curvature of the contour line at the negative curvature portion in a second section lying below the first section and parallel to the first section is referred to as a second curvature maximum value, the second curvature maximum value is larger than the first curvature maximum value.

6. The guide vane according to claim 1,
wherein, where a maximum value of an absolute value of the curvature of the contour line at the negative curvature portion in a first section perpendicular to the guide vane rotation axis is referred to as a first curvature maximum value, while a maximum value of an absolute value of the curvature of the contour line at the negative curvature portion in a second section lying below the first section and parallel to the first section is referred to as a second curvature maximum value, the second curvature maximum value is larger than the first curvature maximum value.

7. A fluid machine comprising:
the runner; and
the guide vane according to claim 1, the guide vane being provided on the outer circumferential side of the runner.

* * * * *